(12) United States Patent
Honma et al.

(10) Patent No.: US 7,347,160 B2
(45) Date of Patent: Mar. 25, 2008

(54) NEEDLE POINTER TYPE METER

(75) Inventors: Hideaki Honma, Niigata (JP); Yasuo Shinbo, Niigata (JP); Satoshi Tsuchiya, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 100 days.

(21) Appl. No.: 10/564,756

(22) PCT Filed: Jun. 21, 2004

(86) PCT No.: PCT/JP2004/008706

§ 371 (c)(1),
(2), (4) Date: Jan. 17, 2006

(87) PCT Pub. No.: WO2005/008184

PCT Pub. Date: Jan. 27, 2005

(65) Prior Publication Data

US 2006/0219155 A1    Oct. 5, 2006

(30) Foreign Application Priority Data

Jul. 17, 2003  (JP) ............................... 2003-275719
Aug. 28, 2003  (JP) ............................... 2003-304752
Feb. 27, 2004  (JP) ............................... 2004-053589

(51) Int. Cl.
*G01D 11/28* (2006.01)

(52) U.S. Cl. .................. 116/288; 116/48; 116/286; 116/305; 116/DIG. 36; 362/23; 362/27

(58) Field of Classification Search ........... 116/288, 116/284, 286, 290, 305, 327, 328, 332, 46, 116/47, 48, 49, DIG. 6, DIG. 36; 362/23, 362/26, 27, 84, 216, 220, 234, 602, 611, 559
See application file for complete search history.

(56) References Cited

U.S. PATENT DOCUMENTS 2,248,325 A * 7/1941 Bacon ...................... 116/62.1

(Continued)

FOREIGN PATENT DOCUMENTS

JP          60-118916 U       8/1985

(Continued)

*Primary Examiner*—Richard Smith
*Assistant Examiner*—Amy R. Cohen
(74) *Attorney, Agent, or Firm*—McDermott Will & Emery LLP

(57) ABSTRACT

It is possible to eliminate the problem that a conductive part to a light source is subjected to stress by operation of a needle-pointer, thereby improving reliability. A needle-pointer type meter includes: an indicator plate having a first see-through portion and an indicator portion surrounding the first see-through portion; a rotary body having a second see-through portion corresponding to the first see-through portion; a drive device for moving the rotary body; a needle-pointer mounted on the rotary body and moving along the indicator portion around the first see-through portion; light sources illuminating the needle-pointer; and a display device for displaying predetermined information to an observer via the see-through portions. A plurality of light sources are arranged at an interval along the movement route of the needle-pointer. The needle-pointer is made of translucent material which emits light when receiving light from a predetermined light source of the plurality of light sources while moving.

21 Claims, 9 Drawing Sheets

U.S. PATENT DOCUMENTS

| | | | |
|---|---|---|---|
| 4,194,587 A * | 3/1980 | Shino et al. | 180/90 |
| 5,259,333 A * | 11/1993 | Iino et al. | 116/286 |
| 5,529,014 A * | 6/1996 | Ohta et al. | 116/286 |
| 6,206,533 B1 * | 3/2001 | Shi | 362/23 |
| 6,320,500 B1 * | 11/2001 | Adelsson et al. | 340/441 |
| 6,404,333 B1 * | 6/2002 | Ayres et al. | 340/461 |
| 6,404,463 B1 * | 6/2002 | Knoll et al. | 349/1 |
| 6,408,783 B1 | 6/2002 | Ludewig | |
| 6,450,656 B1 * | 9/2002 | Noll | 362/23 |
| 6,484,663 B2 * | 11/2002 | Zech et al. | 116/284 |
| 6,674,497 B2 * | 1/2004 | Brandt | 349/74 |
| 6,718,906 B2 * | 4/2004 | Quigley et al. | 116/62.4 |
| 6,817,310 B2 * | 11/2004 | Sugiyama et al. | 116/62.4 |
| 6,959,995 B2 * | 11/2005 | Ikarashi et al. | 362/23 |
| 7,015,986 B2 * | 3/2006 | Brandt et al. | 349/58 |
| 7,048,397 B2 * | 5/2006 | Birman | 362/26 |
| 7,126,564 B2 * | 10/2006 | Schach et al. | 345/75.1 |
| 7,159,534 B2 * | 1/2007 | Tanaka et al. | 116/300 |
| 2002/0051356 A1 * | 5/2002 | Takahashi et al. | 362/31 |
| 2002/0174733 A1 * | 11/2002 | Rothermel | 73/866.3 |
| 2006/0209525 A1 * | 9/2006 | Birman et al. | 362/23 |
| 2006/0219155 A1 * | 10/2006 | Honma et al. | 116/288 |
| 2006/0290486 A1 * | 12/2006 | Sumiya et al. | 340/461 |

FOREIGN PATENT DOCUMENTS

| | | |
|---|---|---|
| JP | 60-176188 U | 11/1985 |
| JP | 61-19718 U | 2/1986 |
| JP | 4-223222 A | 8/1992 |
| JP | 11-245687 | 9/1999 |
| JP | 2000-131099 A | 5/2000 |
| JP | 2000-186948 A | 7/2000 |
| JP | 2003-14508 A | 1/2003 |

* cited by examiner

NEEDLE POINTER TYPE METER

TECHNICAL FIELD

The present invention relates to a needle pointer type meter mounted on a vehicle including an automobile as a typical example, and more particularly to a needle pointer type meter having a through-vision section which is formed by a penetrating portion or a transparent portion and is disposed in the central region of an index plate containing the virtual rotation center of a needle pointer. In this needle pointer type meter (hereinafter referred to as centerless needle pointer type meter for the sake of convenience), a display device such as liquid crystal display device disposed at the back of the index plate is visually recognized through the through-vision section, and display using the needle pointer is provided on the outer periphery of the through-vision section.

BACKGROUND ART

A centerless needle pointer type meter has been disclosed in Patent Reference No. 1, for example. This needle pointer type meter includes: an annular index plate having a through-hole-shaped through-vision section in its central region; a display device including a liquid crystal panel which faces to the through-vision section of the index plate; a ring-shaped rotary body (movable body) which is interposed between the display device and the index plate and has a penetrating portion corresponding to the through-vision section; a needle pointer attached to the rotary body through the inner edge of the through-vision section to extend onto the index plate; and a drive device disposed at a position other than the through-vision section to rotate the rotary body. The needle pointer extending onto the index plate rotates in accordance with the rotation of the rotary body which is rotated by the drive device.

Patent Reference No. 1: JP-A-2000-131099

Another centerless needle pointer type meter whose needle pointer emits light is also known. According to Patent Reference No. 2, for example, a needle pointer and a light source including a light-emitting diode for illuminating the needle pointer are mounted on a rotary body formed by a transparent circular plate through which a display device can be visually recognized. Electric power is supplied to the light source using a belt-shaped flexible conductor (FPC) disposed at the back of the rotary body. In this structure, the flexible conductor is curved concentrically with the rotary body and has a 180-degree folded portion. The 180-degree folded portion shifts in accordance with the movement of the rotary body.

Patent Reference No. 2: JP-A-2000-186948

DISCLOSURE OF THE INVENTION

Problems that the Invention is to Solve

In the needle pointer type meter disclosed in Patent reference No. 2 provided with the needle pointer which emits light, however, since the 180-degree folded portion of the flexible conductor shifts in accordance with the movement of the needle pointer, stress generated due to the movement of the needle pointer is always applied to the flexible conductor, which lowers the reliability. Moreover, in the structure using the flexible conductor, since the flexible conductor needs to be wound around areas other than the position of the display device, the size of the display device is limited.

Accordingly, it is an object of the invention to provide a needle pointer type meter capable of solving the above problems and increasing its reliability.

Means for Solving the Problems

A needle pointer type meter according to the invention includes: an index plate having a first through-vision section and indexes surrounding the first through-vision section; a movable body having a second through-vision section; a drive device for moving the movable body; a needle pointer which is attached to the movable body and moves along the indexes around the first through-vision section; a light source for illuminating the needle pointer; and a display device for displaying predetermined information to an observer through the first and second through-vision sections. The needle pointer type meter is characterized by having one of the following structures a) through d).

a) The light source is formed by a plurality of light sources disposed at certain intervals along the movement route of the needle pointer, and the needle pointer is made of light-transmissive material which receives light from a given light source of the plural light sources in accordance with the movement of the needle pointer so that the needle pointer can emit light.

b) The light source is formed by a belt-shaped planar light-emitting body disposed along the movement route of the needle pointer, and the needle pointer is made of light-transmissive material which receives light from a particular light-emitting region of the light source in accordance with the movement of the needle pointer so that the needle pointer can emit light.

c) The light source is formed by a pipe-shaped light-emitting body disposed along the movement route of the needle pointer, and the needle pointer is made of light-transmissive material which receives light from a particular light-emitting region of the light source in accordance with the movement of the needle pointer so that the needle pointer can emit light.

d) Illumination means is formed by a light transmissive body disposed along the movement route of the needle pointer and a light source for supplying light such that the light transmissive body can emit light, and the needle pointer is made of light-transmissive material which receives light from a particular light-emitting region of the light transmissive body in accordance with the movement of the needle pointer so that the needle pointer can emit light.

A needle pointer type meter according to the invention includes: an index plate having a first through-vision section and indexes surrounding the first through-vision section; a movable body which has a second through-vision section corresponding to the first through-vision section; a drive device for moving the movable body; a needle pointer which is attached to the movable body and moves along the indexes around the first through-vision section; a light source for illuminating the needle pointer; and a display device for displaying predetermined information to an observer through the first and second through-vision sections. The needle pointer type meter is characterized in that the light source is formed by a plurality of light sources disposed at certain intervals along the movement route of the needle pointer, and that the needle pointer is made of light-transmissive material which receives light from a given light source of the plural light sources in accordance with the movement of the needle pointer so that the needle pointer can emit light.

A needle pointer type meter according to the invention includes: an index plate having a first through-vision section and indexes surrounding the first through-vision section; a movable body which has a second through-vision section corresponding to the first through-vision section; a drive device for moving the movable body; a needle pointer which is attached to the movable body and moves along the indexes around the first through-vision section; a light source for illuminating the needle pointer; and a display device for displaying predetermined information to an observer through the first and second through-vision sections. The needle pointer type meter is characterized in that the light source is formed by a belt-shaped planar light-emitting body disposed along the movement route of the needle pointer, and that the needle pointer is made of light-transmissive material which receives light from a particular light-emitting region of the light source in accordance with the movement of the needle pointer so that the needle pointer can emit light.

A needle pointer type meter according to the invention includes: an index plate having a first through-vision section and indexes surrounding the first through-vision section; a movable body which has a second through-vision section corresponding to the first through-vision section; a drive device for moving the movable body; a needle pointer which is attached to the movable body and moves along the indexes around the first through-vision section; a light source for illuminating the needle pointer; and a display device for displaying predetermined information to an observer through the first and second through-vision sections. The needle pointer type meter is characterized in that the light source is formed by a pipe-shaped light-emitting body disposed along the movement route of the needle pointer, and that the needle pointer is made of light-transmissive material which receives light from a particular light-emitting region of the light source in accordance with the movement of the needle pointer so that the needle pointer can emit light.

A needle pointer type meter according to the invention includes: an index plate having a first through-vision section and indexes surrounding the first through-vision section; a movable body which has a second through-vision section corresponding to the first through-vision section; a drive device for moving the movable body; a needle pointer which is attached to the movable body and moves along the indexes around the first through-vision section; illumination means for illuminating the needle pointer; and a display device for displaying predetermined information to an observer through the first and second through-vision sections. The needle pointer type meter is characterized in that the illumination means having is formed by a light transmissive body disposed along the movement route of the needle pointer and a light source for supplying light such that the light transmissive body can emit light, and that the needle pointer is made of light-transmissive material which receives light from a particular light-emitting region of the light transmissive body in accordance with the movement of the needle pointer so that the needle pointer can emit light.

A needle pointer type meter according to the invention is characterized by including the following structures. The first through-vision section is formed by a penetrating portion. The plural light sources are disposed on the outer periphery of the indexes and at inner positions from the surface of the index plate such that respective light-emitting portions of the light sources face to the first through-vision section. The needle pointer has a light introduction portion which extends between the light sources and the first through-vision section along the back surface of the index plate to introduce light emitted from the light sources toward the first through-vision section, an indicator which extends between the first through-vision section and the light sources along the front surface of the index plate to indicate the indexes, and an intermediate portion which connects the indicator and the light introduction portion on the first through-vision section side and introduces light coming from the light introduction portion to the indicator so that the indicator can emit light.

A needle pointer type meter according to the invention is characterized by including the following structures. The first through-vision section is formed by a penetrating portion. The light source is disposed on the outer periphery of the indexes and at an inner position from the surface of the index plate such that the light-emitting region of the light source faces to the first through-vision section. The needle pointer has a light introduction portion which extends between the light source and the first through-vision section along the back surface of the index plate to introduce light emitted from the light source toward the first through-vision section, an indicator which extends between the first through-vision section and the light source along the front surface of the index plate to indicate the indexes, and an intermediate portion which connects the indicator and the light introduction portion on the first through-vision section side and introduces light coming from the light introduction portion to the indicator so that the indicator can emit light.

A needle pointer type meter according to the invention is characterized by including the following structures. The first through-vision section is formed by a penetrating portion. The light transmissive body is disposed on the outer periphery of the indexes and at an inner position from the surface of the index plate such that a light supplying portion for supplying light to the needle pointer faces to the first through-vision section. The needle pointer has a light introduction portion which extends between the light transmissive body and the first through-vision section along the back surface of the index plate to introduce light emitted from the light supplying portion of the light transmissive body toward the first through-vision section, an indicator which extends between the first through-vision section and the light transmissive body along the front surface of the index plate to indicate the indexes, and an intermediate portion which connects the indicator and the light introduction portion on the first through-vision section side and introduces light coming from the light introduction portion to the indicator so that the indicator can emit light.

A needle pointer type meter according to the invention is characterized in that the light introduction portion extends from the intermediate portion forming a sector.

A needle pointer type meter according to the invention is characterized by including the following structures. A light introduction plate is disposed between the light introduction portion and the index plate or the indexes. The light-emitting portion of the light source is opposed to both the outer peripheral sides of the light introduction plate and the light introduction portion. Light emitted from the light source is introduced through the respective outer peripheral sides into the light introduction plate and the light introduction portion so that the indicator and the indexes can emit light.

A needle pointer type meter according to the invention is characterized by including the following structures. A light introduction plate is disposed between the light introduction portion and the index plate or the indexes. The light-emitting region of the light source is opposed to both the outer peripheral sides of the light introduction plate and the light introduction portion. Light emitted from the light source is introduced through the respective outer peripheral sides into the light introduction plate and the light introduction portion so that the indicator and the indexes can emit light.

A needle pointer type meter according to the invention is characterized by including the following structures. A light introduction plate is disposed between the light introduction portion and the index plate or the indexes. The light supplying portion of the light transmissive body is opposed to both the outer peripheral sides of the light introduction plate and the light introduction portion. Light coming from the light transmissive body is introduced through the respective outer peripheral sides into the light introduction plate and the light introduction portion so that the indicator and the indexes can emit light.

A needle pointer type meter according to the invention is characterized by including the following structures. A light introduction plate is disposed between the light introduction portion and the index plate or the indexes. The light source is opposed to the outer peripheral side of the light introduction portion, and light emitted from the light source is introduced through the outer peripheral side of the light introduction portion so that the indicator can emit light. A plurality of index light sources which are disposed at certain intervals in such positions that respective light emitting portions of the index light sources face to the first through-vision section are opposed to the outer peripheral side of the light introduction plate. Light emitted from the index light sources is introduced through the outer peripheral side of the light introduction plate so that the indexes can emit light.

A needle pointer type meter according to the invention is characterized by including the following structures. A light introduction plate is disposed between the light introduction portion and the index plate or the indexes. The light source is opposed to the outer peripheral side of the light introduction portion, and light emitted from the light source is introduced through the outer peripheral side of the light introduction portion so that the indicator can emit light. An index light source formed by a belt-shaped planar light-emitting body disposed in such a position that a light-emitting region of the index light source faces to the first through-vision section is opposed to the outer peripheral side of the light introduction plate. Light emitted from the index light source is introduced through the outer peripheral side of the light introduction plate so that the indexes can emit light.

A needle pointer type meter according to the invention is characterized by including the following structures. A light introduction plate is disposed between the light introduction portion and the index plate or the indexes. The light source is opposed to the outer peripheral side of the light introduction portion, and light emitted from the light source is introduced through the outer peripheral side of the light introduction portion so that the indicator can emit light. An index light source formed by a pipe-shaped light-emitting body disposed in such a position that a light-emitting region of the index light source faces to the first through-vision section is opposed to the outer peripheral side of the light introduction plate. Light emitted from the index light source is introduced through the outer peripheral side of the light introduction plate so that the indexes can emit light.

A needle pointer type meter according to the invention is characterized by including the following structures. The light transmissive body is formed by a circular-arc-shaped flat plate extending along the movement route of the needle pointer. The light source is opposed to the inner or outer peripheral edge of the circular-arc-shaped flat plate.

A needle pointer type meter according to the invention is characterized by including the following structures. The light transmissive body has a circular-arc-shaped flat plate portion extending along the movement route of the needle pointer, and a pipe-shaped portion extending in a direction different from that of the flat plate portion. The light source is opposed to the pipe-shaped portion.

A needle pointer type meter according to the invention is characterized in that a condensing section for condensing light emitted from the light source is provided on the transmissive body at the position opposed to the light source.

A needle pointer type meter according to the invention is characterized in that the light source is supported by a belt-shaped flexible conductor.

A needle pointer type meter according to the invention is characterized in that the light source and the index light source are supported by a common belt-shaped flexible conductor.

A needle pointer type meter according to the invention is characterized in that the movable body is a gear wheel which is rotated by the drive device.

A needle pointer type meter according to the invention is characterized in that the movable body is a belt-shaped body which is moved in the longitudinal direction by the drive device.

ADVANTAGE OF THE INVENTION

The needle pointer type meter according to the invention is capable of achieving the initial object of the invention and increasing its reliability.

Figure 1:
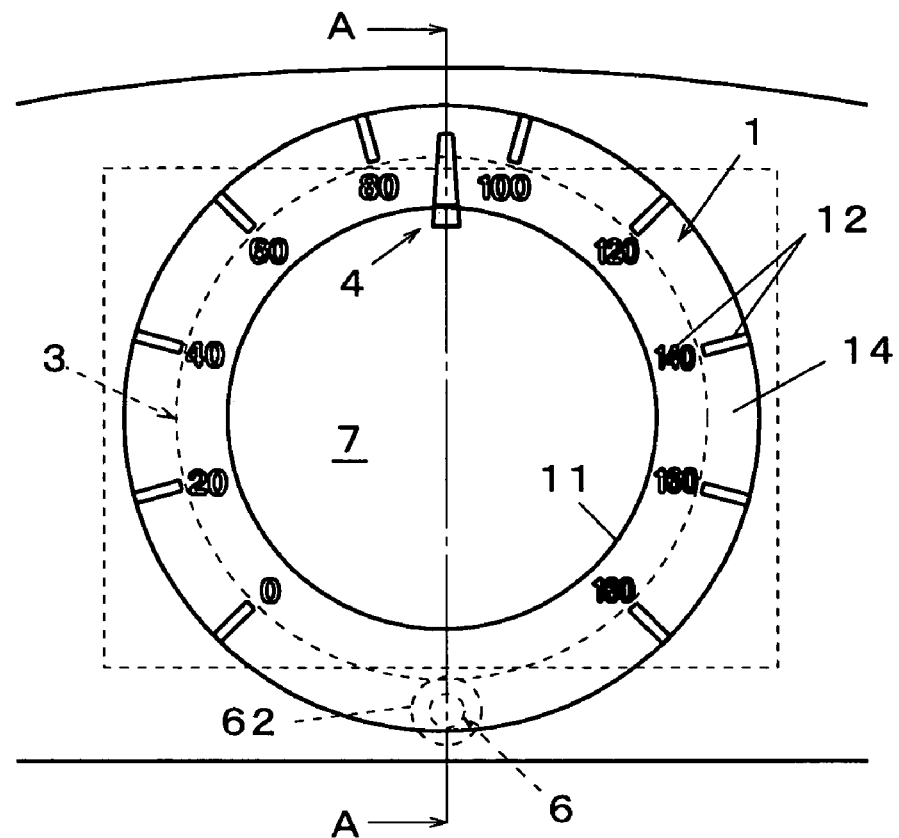
FIG. 1 is a front view of a needle pointer type meter in a first embodiment according to the invention.

DESCRIPTION OF THE REFERENCE NUMERALS AND SIGNS 1 index plate
2 light introduction plate
3 rotary body (movable body)
4 needle pointer
5 supporting body
6 drive device
7 display device
8 circuit board
9 belt-shaped conductor (movable body)
11 first through-vision section
12 index
22 outer peripheral side
31 second through-vision section
43 light introduction portion
44 indicator
45 intermediate portion
46 light receiving surface (outer peripheral side)
100 light transmissive body
101 inner peripheral side wall
102 open end
103 outer peripheral side wall
104 reflection wall
111 light transmissive body light receiving portion
112 light transmissive body illuminating portion
113 light condensing section
114 flat plate portion
115 pipe-shaped portion
B belt
L light source
LB light source board
L1 first light source (index light source)
L2 second light source
LF light-emitting portion
LR light-emitting region
LM illumination means

BEST MODE FOR CARRYING OUT THE INVENTION

Figure 2:
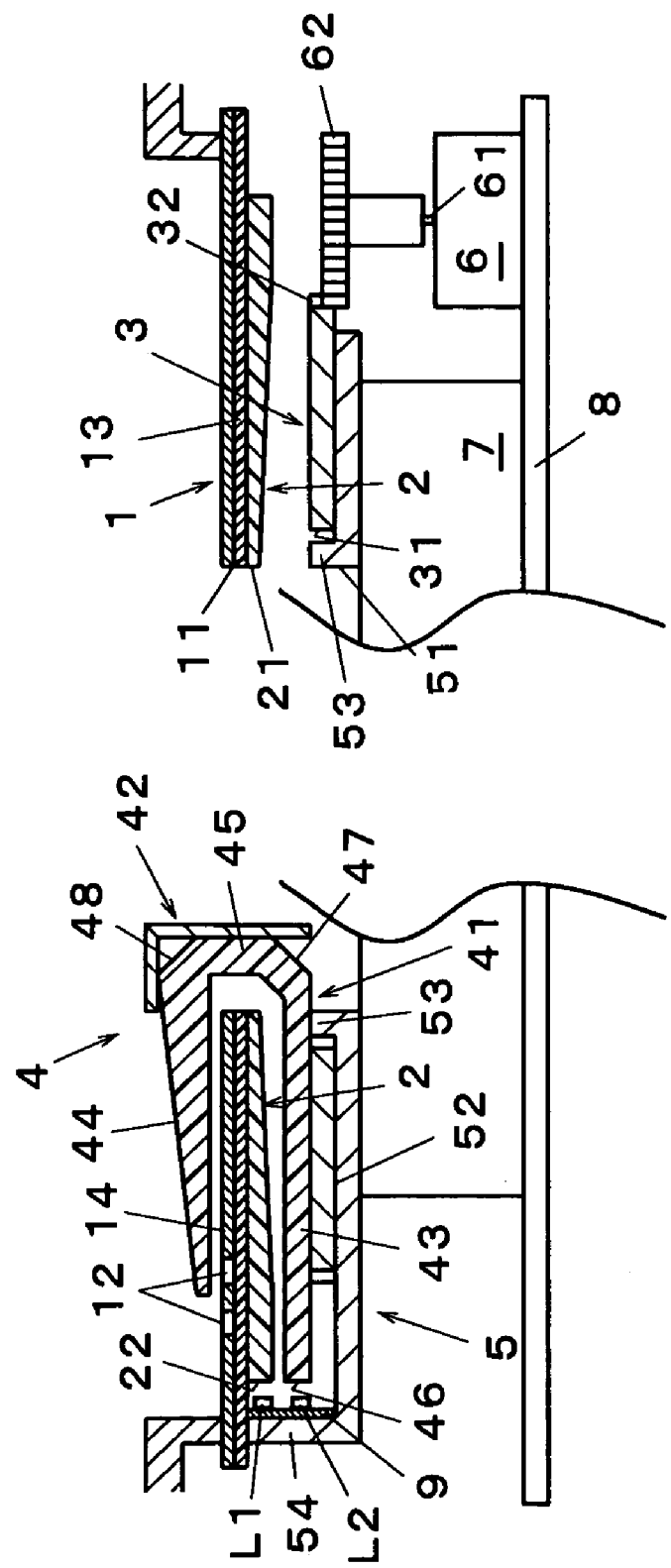
FIG. 2 is a cross-sectional view of the needle pointer type meter taken along a line A-A in FIG. 1.
Figure 3:
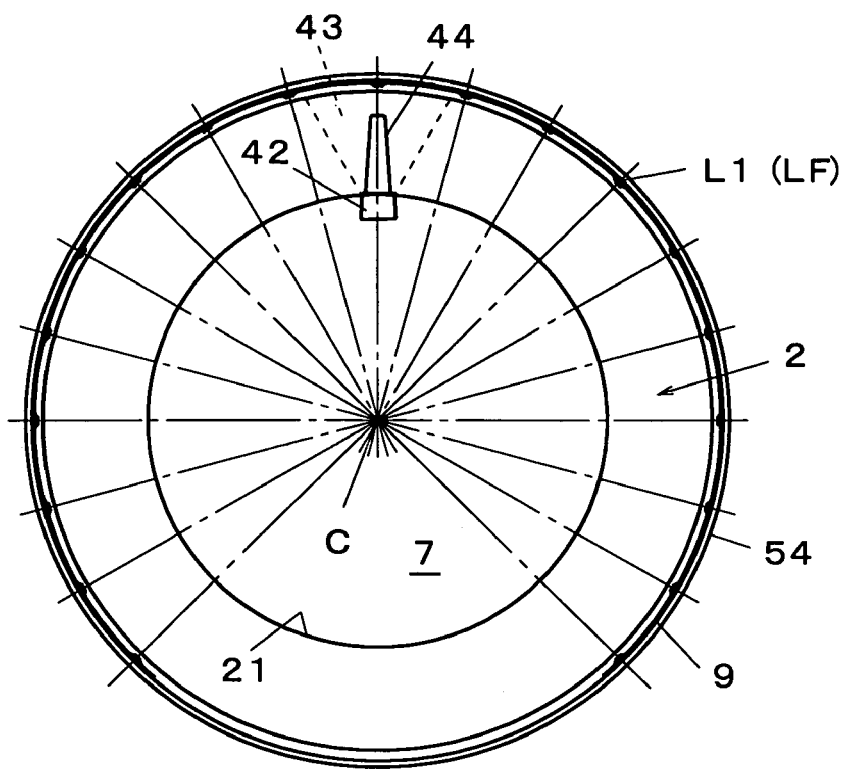
FIG. 3 is a front view of the needle pointer type meter shown in FIG. 1 from which an index plate is removed.
Figure 4:
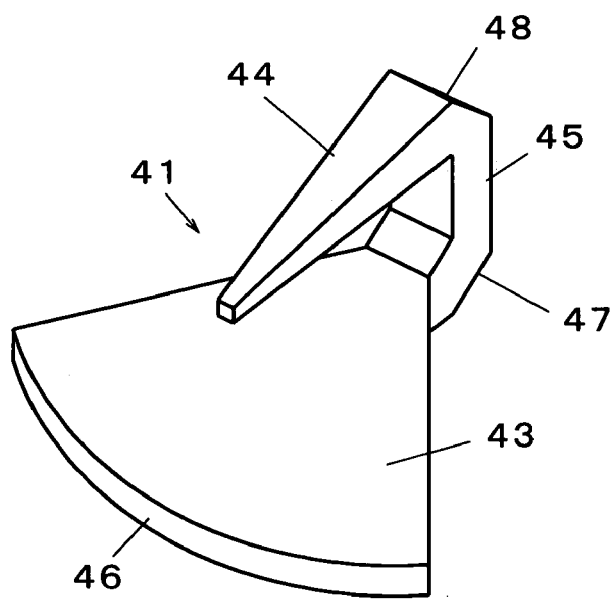
FIG. 4 is a perspective view illustrating a main part of a needle pointer used in the first embodiment.
Figure 5:
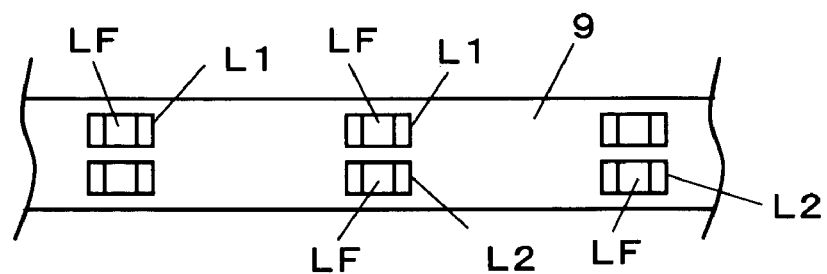
FIG. 5 is a front view illustrating a main part of light sources used in the first embodiment.

Described below with reference to the appended drawings are needle pointer type meters in several embodiments according to the invention. FIGS. 1 through 5 illustrate a needle pointer type meter in a first embodiment according to the invention, wherein: FIG. 1 is a front view of a needle pointer type meter in this embodiment; FIG. 2 is a cross-sectional view of the needle pointer type meter taken along a line A-A in FIG. 1; FIG. 3 is a front view of the needle pointer type meter shown in FIG. 1 from which an index plate is removed; FIG. 4 is a perspective view illustrating a main part of a needle pointer used in this embodiment; and FIG. 5 is a front view illustrating a main part of light sources used in this embodiment.

As illustrated in FIGS. 1 and 2, the needle pointer type meter in this embodiment includes: an index plate 1; a light introduction plate 2 disposed at the back of the index plate 1; a rotary body (movable body) 3 disposed at the back of the light introduction plate 2; a needle pointer 4 attached to the rotary body 3; a supporting body 5 for supporting the rotary body 3 such that the rotary body 3 can rotate; a drive device 6 for rotating the rotary body 3; a display device 7 for displaying predetermined information to an observer; a circuit board 8 disposed at the back of the display device 7; first light sources (index light source) L1 for illuminating the index plate 1; and second light sources (needle pointer light source) L2 for illuminating the needle pointer 4.

The index plate 1 is formed by a substantially annular plate material having a round through hole (penetrating portion), for example, which constitutes a first through-vision section 11. Indexes 12 such as characters and graduations are arranged to form a circular arc around the first through-vision section 11 along the movement route of the needle pointer 4. The indexes 12 and a base portion 14 as a background are formed by screen printing or other methods on a base material 13 which is formed by a substantially annular light-transmissive synthetic resin plate so that the indexes 12 can transmit light and the background can block light.

The light introduction plate 2 is formed by a light-transmissive synthetic resin plate which is superposed on the back of the index plate 1. The light introduction plate 2 has a through hole 21 corresponding to the first through-vision section 11. An outer peripheral side 22 of the light introduction plate 2 is opposed to the first light sources L1 which will be described in detail later, and light coming from the light sources L1 is introduced through the outer peripheral side 22 to illuminate the indexes 12 of the index plate 1 from the rear. While the light introduction plate 2 is provided separately from the index plate 1 and the outer peripheral side 22 of the light introduction plate 2 faces to the first light sources L1 in this embodiment, the indexes 12 may be screen-printed on the front surface of the light introduction plate 2 so that the index plate 1 can be eliminated or can be used as a base material for the index plate 1. In this case, the light introduction plate 2 is interposed between the indexes 12 and a light introduction portion of the needle pointer 4, which portion will be described later.

The rotary body 3 is formed by a substantially annular synthetic resin plate material having a second through-vision section 31. The second through-vision section 31 is defined by a through hole corresponding to the first through-vision section 11 and the through hole 21 of the light introduction plate 2. A gear section 32 formed on the outer periphery of the rotary body 3 engages with a driving gear of the drive device 6, which gear will be described later. Thus, the rotary body 3 in this embodiment functions as a gear wheel.

As illustrated in FIG. 2, the needle pointer 4 includes: a light transmissive body 41 made of light-transmissive synthetic resin (light-transmissive material), for example, which has a substantial U-shaped cross section; and a cover 42 which is made of light-blocking synthetic resin to cover a desired portion of the light transmissive body 41.

The light transmissive body 41 includes: a light introduction portion 43 which extends between the second light sources L2 which will be described in detail later and the first through-vision section 11 along the back surface of the index plate 1 (light introduction plate 2) to introduce light coming from the second light sources L2 toward the first through-vision section 11; an indicator 44 which extends between the first through-vision section 11 and the second light sources L2 along the front surface of the index plate 1 to indicate the indexes 12; and an intermediate portion 45 which connects the indicator 44 and the light introduction portion 43 on the first through-vision section 11 side and introduces light coming from the light introduction portion 43 to the indicator 44 so that the indicator 44 can emit light.

As illustrated in FIG. 4 in detail, the light introduction portion 43 extends from the intermediate portion 45 toward the second light sources L2 forming a sector. A light receiving surface 46 for introducing light coming from the second light sources L2 toward the inside of the light introduction portion 43 is formed on the outer peripheral side of the light introduction portion 43 in a position corresponding to (opposed to) the second light sources L2. The light receiving surface 46 is provided on a circular-arc surface extending in the shape of sector.

The indicator 44 linearly extends from the inner edge of the first through-vision section 11 toward the indexes 12. Not-shown hot-stamp layers such as a coloring layer and a reflection layer are provided on the front surface or back surface of the indicator 44.

The intermediate portion 45 extends frontward from the end of the light introduction portion 43 on the first through-vision 11 side, through the inner edge of the first through-vision section 11, toward the end of the indicator 44 on the first through-vision 11 side. A first reflection surface 47 for reflecting light coming from the light introduction portion 43 toward the intermediate portion 45 is formed at a connecting position between the intermediate portion 45 and the light introduction portion 43. A second reflection surface 48 for reflecting light coming from the intermediate portion 45 toward the tip of the indicator 44 is formed at a connecting position between the intermediate portion 45 and the indicator 44.

The cover 42 is fixed to the light transmissive body 41 in such a position as to cover the area from the end of the indicator 44 on the first through-vision section 11 side to the periphery of the intermediate portion 45.

In this embodiment, a part of the back surface of the light introduction portion 43 is fixed to the rotary body 3 so that the needle pointer 4 can move on the index plate 1 along the indexes 12 in accordance with the rotation of the rotary body 3.

The supporting body 5 is formed by a substantially annular synthetic resin component having a through hole 51 corresponding to the first and second through-vision sections 11 and 31 and the through hole 21. The supporting body 5 has a concave 52 which accommodates and supports the rotary body 3 such that the rotary body 3 can rotate. The concave 52 has an inner annular projection 53 and an outer annular projection 54. The first and second light sources L1 and L2 are disposed on the inner surface of the outer annular projection 54.

The drive device 6 is constituted by a stepping motor or a cross coil type movement, for example, and is disposed on the circuit board 8 outside the first and second through-vision sections 11 and 31 (on the outer periphery side of the rotary body 3). A driving gear 62 for engaging with the gear section 32 of the rotary 3 is fixed to a rotary shaft 61 of the drive device 6. The drive device 6 rotates the gear section 32 engaging with the driving gear 62 in accordance with the measurement so that the needle pointer 4 fixed to the rotary body 3 can provide indication on the index plate 1. A notch for connecting the gear section 32 of the rotary body 3 and the driving gear 62 is formed on the supporting body 5 at a position corresponding to the connection between the gear section 32 and the driving gear 62.

The first and second light sources L1 and L2 are formed by chip type light-emitting diodes to be mounted on a surface, and the plural diodes of the first and second light sources L1 and L2 arranged in rows are attached to and supported by a common belt-shaped flexible conductor (for example, FPC: flexible print circuit) 9. A not-shown copper foil pattern for supplying electric power to the first and second light sources L1 and L2 is provided on the belt-shaped conductor 9. The first and second light sources L1 and L2 are mounted on the copper foil pattern.

As illustrated in FIG. 5, the plural first light sources L1 and second light sources L2 are disposed in rows on the belt-shaped conductor 9 such that the first and second light sources L1 and L2 are in parallel with each other with a fixed clearance interposed therebetween. While attached to the supporting body 5, the first light sources L1 are located on the outer periphery (outside) of the indexes 12 and at inner positions from the surface of the index plate 1 such that respective light emitting portions LF of the first light sources L1 face to the first through-vision section 11 side, or more specifically to a movement center C of the needle pointer 4 (see FIG. 3). In this arrangement, since the light emitting portions Lf are opposed to the outer peripheral side 22 of the light introduction plate 2, light can be supplied into the light introduction plate 2 through the outer peripheral side 22. Thus, the first light sources L1 function as an index light source for illuminating the indexes 12 of the index plate 1. Similarly to the first light sources L1, the second light sources L2 are positioned outside the indexes 12 and at inner positions from the surface of the index plate 1 (and the first light sources L1) such that the respective light emitting portions LF of the second light sources L2 face to the first through-vision section 11 side, or more specifically to the movement center C of the needle pointer 4 (see FIG. 3). In this arrangement, since the light emitting portions Lf are opposed to the light receiving surface (outer peripheral side) 46 of the light introduction portion 43 of the needle pointer 4, light can be supplied into the light introduction portion 43 through the light receiving surface 46. Thus, the second light sources L2 function as a needle pointer light source for illuminating the indicator 44.

In this structure, the light introduction plate 2 which receives the entire light from the first light sources L1 always illuminates the indexes 12. As for the needle pointer 4, the light receiving surface 46 comes to be opposed to a part of the plural light sources L2 (a given light source L2) in accordance with the position of the needle pointer 4 which are rotating, and light coming from the part of the plural light sources L2 is introduced into the light transmissive body 41 so that the indicator 44 can emit light.

The display device 8 is produced by incorporating a display panel constituted by TFT (thin-film transistor) type liquid crystal display elements or organic electric-field light-emitting elements, for example, into a frame body. The display device 7 is disposed on the circuit board 9 such that the display surface of the display panel faces to the first and second through-vision sections 11 and 31. Any information can be displayed on the display device 8, examples of which involve travel distance information, navigation information, shift position information, outside temperature information, and other various picture information.

The circuit board 1 is a hard circuit board on which a not-shown drive control circuit for controlling the operations of the drive device 6, the display device 7, and the respective light sources L1 and L2 is provided.

As described above, the needle pointer type meter in this embodiment includes: the index plate 1 which has the first through-vision section 11 and the indexes 12 surrounding the first through-vision section 11; the rotary body 3 which has the second through-vision section 31 corresponding to the first through-vision section 11; the drive device 6 for moving the rotary body 3; the needle pointer 4 which is attached to the rotary body 3 and moves along the indexes 12 around the circumference of the first through-vision section 11; the light sources L2 for illuminating the needle pointer 4; and the display device 7 for displaying predetermined information to the observer through the first and second through-vision sections 11 and 31. The plural light sources L2 are disposed at certain intervals along the movement route of the needle pointer 4. The needle pointer 4 is made of a light-transmissive material which emits light when receiving light coming from a given light source L2 of the plural light sources L2 in accordance with the movement of the needle pointer 4. In this structure, since the light source energizing route does not move, the light source energizing components does not receive stress caused due to the movement of the needle pointer. Thus, the reliability is enhanced. Moreover, the condition where the light source energizing components become an obstacle in the component layout can be prevented, which increases design freedom.

In this embodiment, the following structure is employed. The through-vision section 11 is formed by a penetrating portion. The plural light sources L2 are located on the outer periphery of the indexes 12 and at inner positions from the surface of the index plate 1 such that the respective light emitting portions LF of the second light sources L2 face to the first through-vision section 11 side. The needle pointer 4 includes: the light introduction portion 43 which extends between the light sources L2 and the first through-vision section 11 along the back surface of the index plate 1 to introduce light coming from the light sources L2 toward the first through-vision section 11; the indicator 44 which extends between the first through-vision section 11 and the light sources L2 along the front surface of the index plate 1 to indicate the indexes 12; and the intermediate portion 45 which connects the indicator 44 and the light introduction portion 43 on the first through-vision section 11 side and introduces light coming from the light introduction portion 43 to the indicator 44 so that the indicator 44 can emit light. In this structure, since the needle pointer 4 can emit light while securing the size of the first through-vision section 11, lowering of displaying quality can be prevented.

In this embodiment, the light introduction portion 43 extends from the intermediate portion 45 forming a sector, which enlarges the area of the light receiving surface 46. Accordingly, the illumination efficiency can be increased.

In this embodiment, the following structure is employed. The light introduction plate 2 is disposed between the light introduction portion 43 and the index plate 1. The light sources L2 are opposed to the outer peripheral side (light receiving surface) 46 of the light introduction portion 43. Light emitted from the light sources L2 is introduced through the outer peripheral side 46 so that the indicator 44 can emit light. The plural index light sources L1, which are disposed at certain intervals in such positions that the respective light emitting portions LF face to the first through-vision section 11, are opposed to the outer peripheral side 22 of the light introduction plate 2. Light coming from the index light sources L1 is introduced through the outer peripheral side 22 of the light introduction plate 2 so that the indexes 12 can emit light. In this structure, the indexes 12 as well as the needle pointer 4 can be illuminated while securing the size of the first through-vision section 11.

In this embodiment, the light sources L2 are disposed on the belt-shaped flexible conductor 9. Therefore, the respective light emitting portions LF of the light sources L2 can be easily disposed in such positions as to face to the first through-vision section 11, which enhances the working efficiency in assembling.

In this embodiment, the light sources L2 and the index light sources L1 are supported on the common belt-shaped flexible conductor 9. Since the number of the components is reduced, the working efficiency in assembling can be increased.

In this embodiment, the movable body is formed by the rotary body 3 which is the gear wheel rotated by the drive device 6. This structure reduces friction caused during movement of the needle pointer 4 positioned on the circumference of the first through-vision section 11 using the drive device 6.

Figure 6:
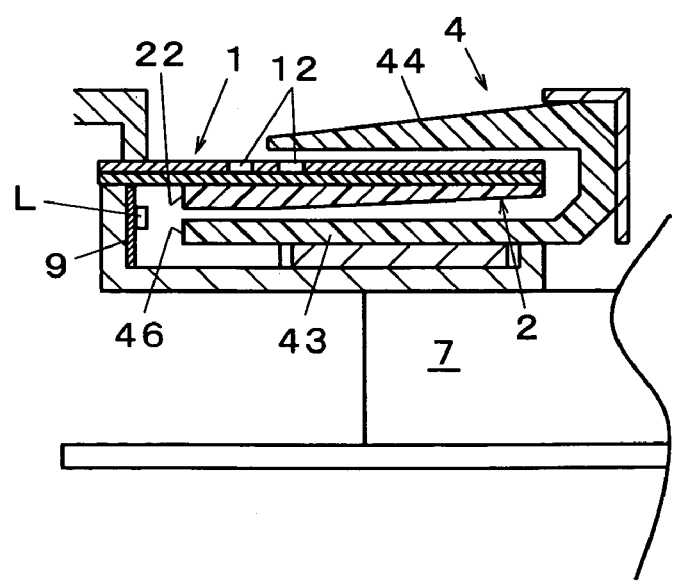
FIG. 6 is a cross-sectional view of a main part of a needle pointer type meter in a second embodiment according to the invention.

FIG. 6 is a cross-sectional view illustrating a main part of a second embodiment according to the invention. In this embodiment, the index light source and the needle pointer light source are not separately provided.

In this embodiment, more specifically, light sources L arranged in a single row are opposed to both the light receiving portion 46 as the outer peripheral side of the light introduction portion 43 and the outer peripheral side 22 of the light introduction plate 2. Light coming from the light sources L is introduced through the respective outer peripheral sides 22 and 46 into both the light introduction portion 43 and the light introduction plate 2 such that the indicator 44 and the indexes 12 can emit light. In this structure, since the number of the light sources is decreased, cost reduction can be achieved.

Figure 7:
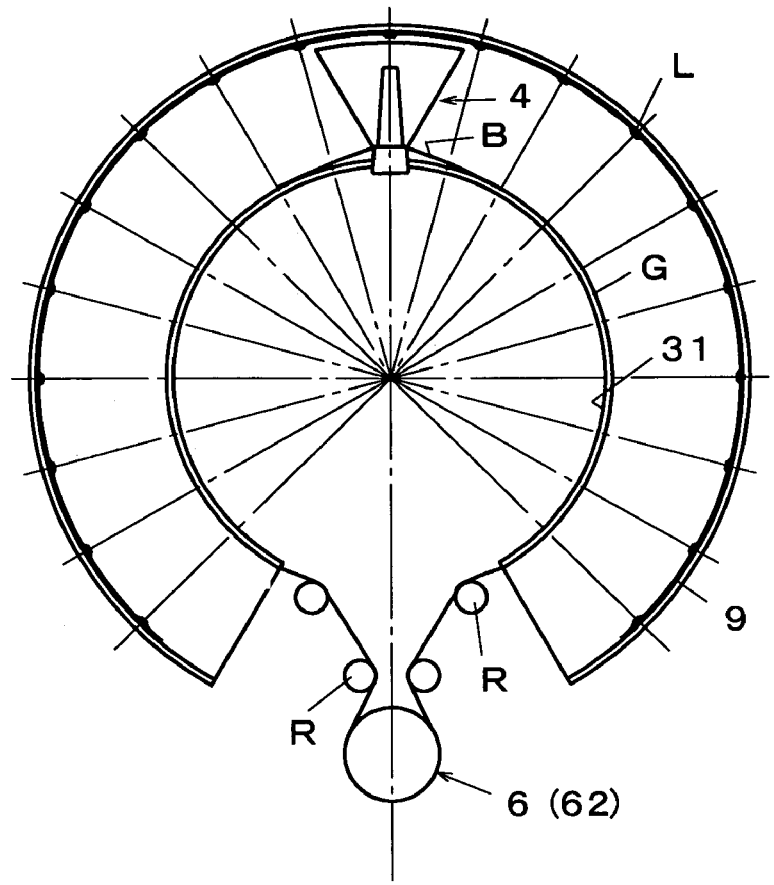
FIG. 7 is a plan view illustrating a main part of a needle pointer type meter in a third embodiment according to the invention.

FIG. 7 is a plain view illustrating a main part of a third embodiment according to the invention. In this embodiment, a belt-shaped body which shifts in the longitudinal direction is used as the rotary body in lieu of the rotary body (movable body) 3 as the gear wheel.

In this embodiment, more specifically, the rotary body for shifting the needle pointer 4 is replaced with a flexible belt B, for example. A plurality of not-shown concave and convex teeth are formed on the belt B. The concave and convex teeth engage with the driving gear 62 of the drive device 6. The belt B shifts in the longitudinal direction along a guide G and a follower roller in accordance with the rotation of the driving gear 62 such that the needle pointer 4 attached to the belt B can move on the not-shown index plate. The structures of the needle pointer 4 and the light sources L are similar to those in the first and second embodiments, but in this embodiment the second through-vision section is produced by attaching the belt B in the shape of a loop. The belt-shaped body is not limited to a belt, but may be made of other materials such as wire as long as they are flexible.

Figure 8:
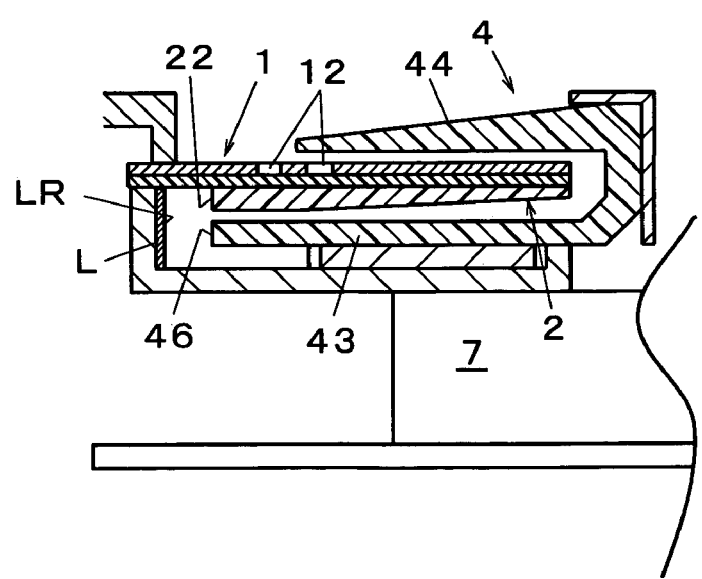
FIG. 8 is a cross-sectional view illustrating a main part of a needle pointer type meter in a fourth embodiment according to the invention.

FIG. 8 is a cross-sectional view illustrating a main part of a fourth embodiment according to the invention. In this embodiment, the light source L is formed by a belt-shaped planar light-emitting body.

More specifically, the light source L is constituted by EL (electro luminescence), for example, which extends along the movement route of the needle pointer 4. A circular-arc-shaped light-emitting region LR of the light source L is disposed in such a position as to face to the first through-vision section 11. The light introduction portion 43 of the needle pointer 4 receives light from a particular region of the light-emitting region LR which emits light from its plane in accordance with the movement of the needle pointer 4, so that the needle pointer 4 can emit light. The light coming from the light source L is also introduced through the outer peripheral side 22 into the light introduction plate 2 so that the indexes 12 can be illuminated through the light introduction plate 2.

In the fourth embodiment, the same advantages as those in the first and second embodiments can be offered.

Figure 9:
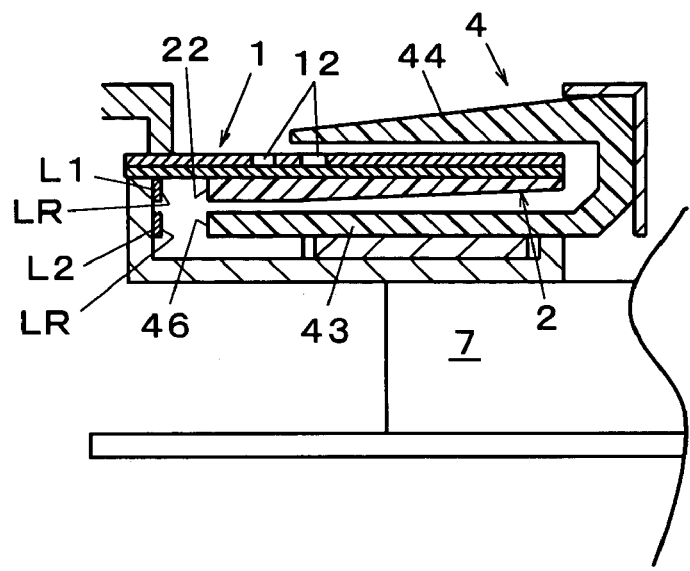
FIG. 9 is a cross-sectional view illustrating a main part of a needle pointer type meter in a fifth embodiment according to the invention.

FIG. 9 is a cross-sectional view illustrating a main part of a fifth embodiment according to the invention. In this embodiment, the belt-shaped light source L is separated into the first light source (index light source) L1 and the second light source (needle pointer light source) L2.

In the fifth embodiment, the same advantages as those in the first embodiment can be offered.

Figure 10:
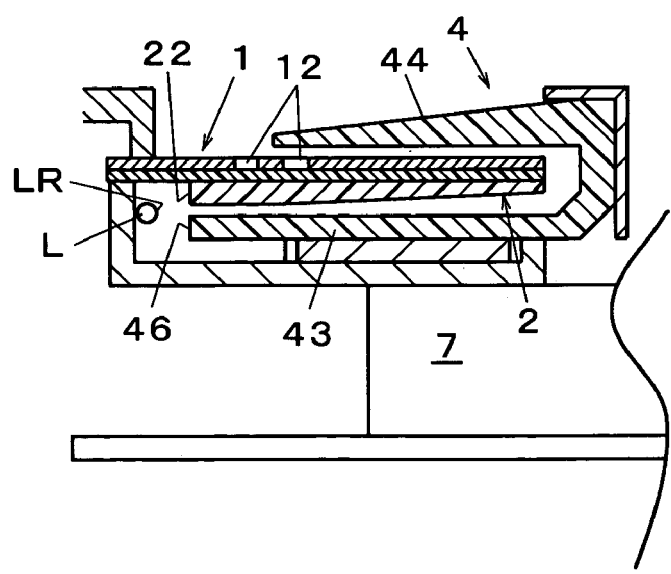
FIG. 10 is a cross-sectional view illustrating a main part of a needle pointer type meter in a sixth embodiment according to the invention.

FIG. 10 is a cross-sectional view illustrating a main part of a sixth embodiment according to the invention. In this embodiment, the light source L is constituted by a tube-shaped light-emitting body.

More specifically, the light source L is formed by a discharge tube such as CCT and CFL, for example, which extends along the movement route of the needle pointer 4. The circular-arc-shaped light-emitting region LR of the light source L is disposed in such a position as to face to the first through-vision section 11. The light introduction portion 43 of the needle pointer 4 receives light from a particular region of the light-emitting region LR which linearly emits light in accordance with the movement of the needle pointer 4, so that the needle pointer 4 can emit light. The light coming from the light source L is also introduced through the outer peripheral side 22 into the light introduction plate 2 so that the indexes 12 can be illuminated through the light introduction plate 2.

In the sixth embodiment, the same advantages as those in the first, second and fourth embodiments can be offered.

Figure 11:
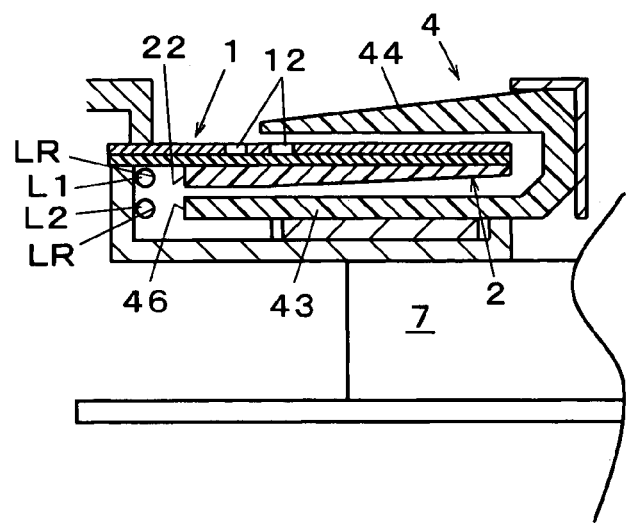
FIG. 11 is a cross-sectional view illustrating a main part of a needle pointer type meter in a seventh embodiment according to the invention.

FIG. 11 is a cross-sectional view illustrating a main part of a seventh embodiment according to the invention. In this embodiment, the tube-shaped light source L is separated into the first light source L1 (for the index) and the second light source L2 (for the needle pointer).

In the seventh embodiment, the same advantages as those in the first and fourth embodiments can be offered.

Figure 12:
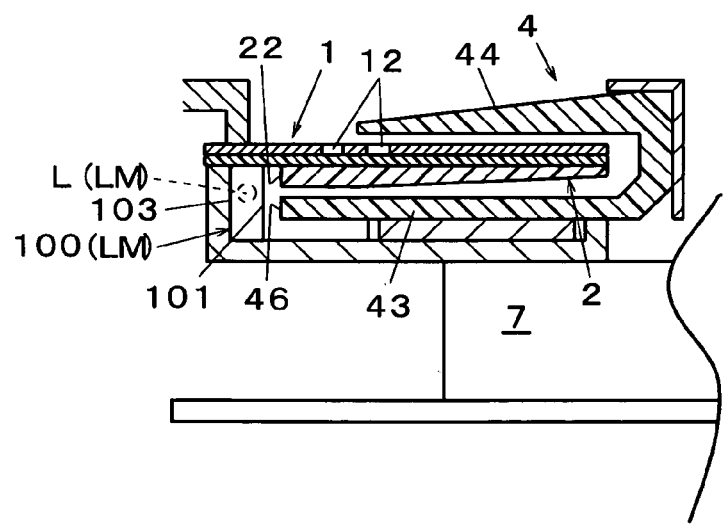
FIG. 12 is a cross-sectional view illustrating a main part of a needle pointer type meter in an eighth embodiment according to the invention.
Figure 13:
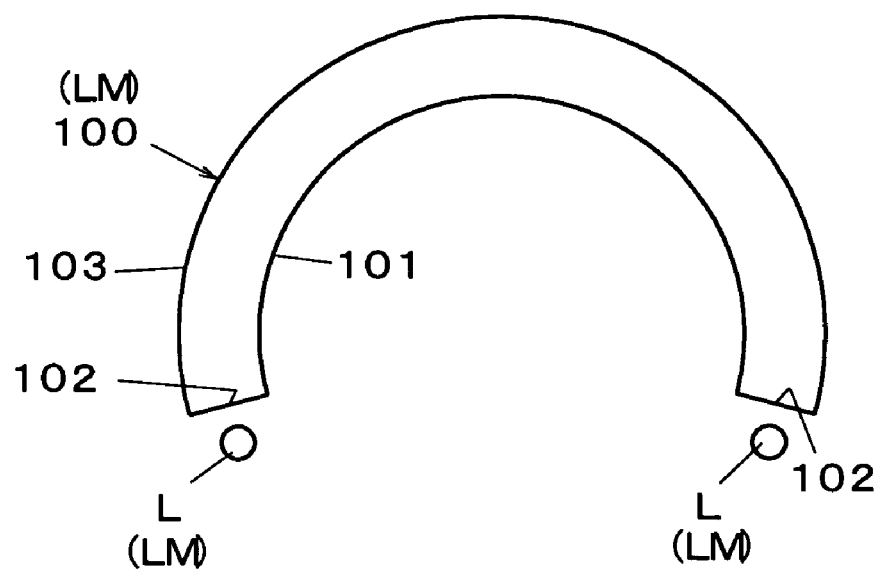
FIG. 13 is a plan view of a light transmissive body used in the eighth embodiment.

FIGS. 12 and 13 is a cross-sectional view illustrating a main part and a front view illustrating a light transmissive body in an eighth embodiment according to the invention. In this embodiment, illumination means LM for illuminating the needle pointer 4 is constituted by the light sources L formed by light-emitting diode, for example, and the light transmissive body 100.

More specifically, the light transmissive body 100 is made of substantially colorless and transparent synthetic resin, and has a circular arc shape extending along the movement route of the needle pointer 4. An inner peripheral side wall 101 of the light transmissive body 100 is opposed to the outer peripheral sides 22 and 46 of the light introduction plate 2 and the needle pointer 4, respectively. As illustrated in FIG. 13, the light sources L are disposed close to open ends 102 of the light transmissive body 100. Light coming from the light sources L is introduced through the open ends 102 into the light transmissive body 100 so that the light transmissive body 100 can emit light. The light introduced through the open ends 102 into the light transmissive body 100 is reflected by an outer peripheral side wall 103 toward the inner peripheral side wall 101, and then is introduced through the inner peripheral side wall 101 into the light introduction plate 2 and the needle pointer 4 so that the indexes 12 and the indicator 44 can be illuminated. In this structure, therefore, the inner peripheral side wall 101 functions as a light supplying portion. In the eighth embodiment, the same advantages as those in the first, second, fourth and sixth embodiments can be offered.

Figure 14:
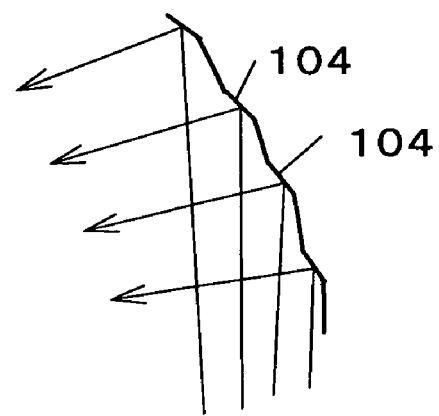
FIG. 14 is a plan view illustrating a main part of a light transmissive body in a ninth embodiment according to the invention.

FIG. 14 is a plan view illustrating a main part of a light transmissive body in a modified example in a ninth embodiment according to the invention.

The light transmissive body 100 in this embodiment has a plurality of step-shaped reflection walls 104 on its outer peripheral wall surface. In this structure, introduced light can be efficiently reflected by the respective reflection walls 104 toward the first through-vision section 11.

Figure 15:
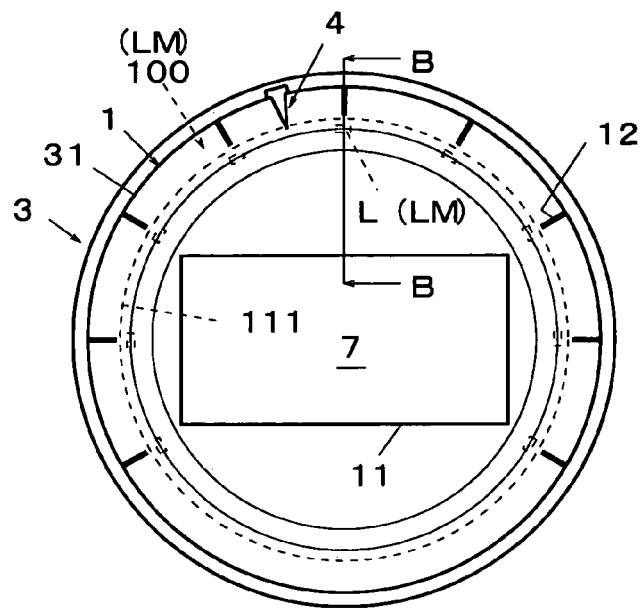
FIG. 15 is a front view illustrating a main part of a needle pointer type meter in a tenth embodiment according to the invention.
Figure 16:
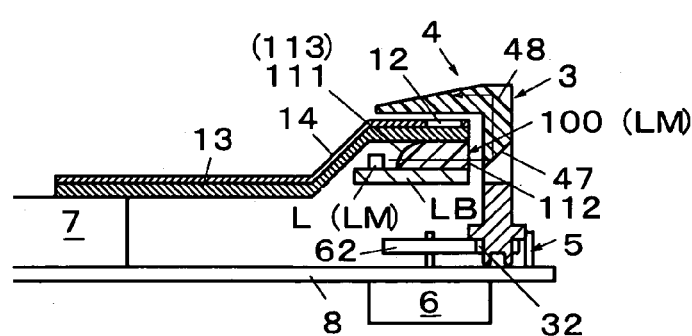
FIG. 16 is a cross-sectional view of the needle pointer type meter taken along a line B-B in FIG. 15.

FIGS. 15 and 16 illustrate a tenth embodiment according to the invention, wherein: FIG. 15 is a front view of the needle pointer type meter; and FIG. 16 is a cross-sectional view taken along a line B-B in FIG. 15.

The needle pointer type meter in this embodiment is different from that in the first embodiment in that: the needle pointer 4 extends from outside of the index plate 1 toward the center; the rotary body (movable body) 3 for moving the needle pointer 4 is an annular component which surrounds the outer periphery of the index plate 1; the second through-vision section 31 has a larger outside diameter than that of the first through-vision section 11; and both the display device 7 exposed through the first through-vision section 11 and the index plate 1 are visually recognized through the second through-vision section 31.

Similarly to the case of the eighth embodiment, the illumination means LM constituted by the light sources L and the light transmissive body 100 is used. The light transmissive body 100 is made of substantially colorless and transparent synthetic resin, and has a circular-arc and flat-plate shape extending along the movement route of the needle pointer 4. In this embodiment, however, a light transmissive body light receiving portion 111 is formed on the inner peripheral edge of the light transmissive body 100 in such a position as to be opposed to the light sources L. On the other hand, a light transmissive body illuminating portion 112 for supplying the light introduced through the light transmissive body light receiving portion 111 to the light introduction portion 46 of the needle pointer 4 is formed on the outer peripheral edge of the light transmissive body 100 in such a position as to be opposed to the light introduction portion 46 of the needle pointer 4. In this case, the light sources L are mounted on a light source board LB. The light emitting portions of the light sources L face to the light transmissive body light receiving portion 111. A part of light emitted from the light sources L directly reaches the index plate 1 and illuminates the indexes 12. Also, light introduced through the light transmissive body light receiving portion 111 into the light transmissive body 100 illuminates the indexes 12 and the needle pointer 4.

Since light emitted from the light sources L is introduced into the light transmissive body 100 before it is supplied to the needle pointer 4, illumination non-uniformity caused relative to the positions of the needle pointer 4 can be reduced. Moreover, since the light transmissive body 100 is a circular-arc-shaped flat plate and its inner peripheral edge is opposed to the light sources L, space-saving design can be achieved.

Additionally, in this embodiment, the light transmissive body light receiving portion 111 (portion opposed to the light sources L) having the shape of a convex lens functions as a condensing section 113 for condensing light emitted from the light sources L and introducing the light into the light transmissive body 100. Thus, illumination efficiency can be increased.

While the light sources L are opposed to the inner peripheral edge of the light transmissive body 100 in this embodiment, the light sources L may be opposed to the outer peripheral edge of the light transmissive body 100. This structure is preferably employed in the needle pointer type meter whose needle pointer 4 extends from the inside toward the outside of the index plate 1 as in the first embodiment.

Figure 17:
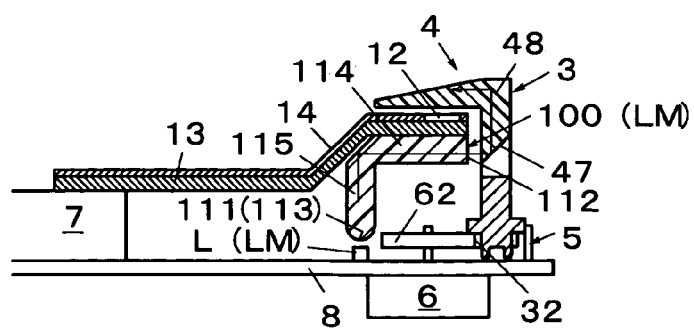
FIG. 17 is a cross-sectional view illustrating a main part of a modified example of a light transmissive body 100 in an eleventh embodiment according to the invention.

FIG. 17 illustrates a modified example of the light transmissive body 100 in an eleventh embodiment according to the invention. The light transmissive body 100 in this embodiment includes a flat plate portion 114 and a pipe-shaped portion 115 extending in a direction different from that of the flat plate portion 114 (toward the circuit board 8). The light sources L are opposed to the pipe-shaped portion 115. In this structure, the light source board LB can be eliminated.

INDUSTRIAL APPLICABILITY

This invention is applicable to needle pointer type meters mounted not only on automobiles but also on other mobile bodies such as motorcycles and agricultural and constructional machines.

The invention claimed is:

1. A needle pointer type meter, comprising:
    an index plate having a first through-vision section and indexes surrounding the first through-vision section;
    a movable body which has a second through-vision section corresponding to the first through-vision section;
    a drive device for moving the movable body;
    a needle pointer which is attached to the movable body and moves along the indexes around the first through-vision section;
    a light source for illuminating the needle pointer; and
    a display device for displaying predetermined information to an observer located in front of the index plate through the first and second through-vision sections, characterized in that:
    the light source is formed by a plurality of light sources disposed at certain intervals along the movement route of the needle pointer, and the needle pointer is made of light-transmissive material which receives light from a given light source of the plural light sources in accordance with the movement of the needle pointer so that the needle pointer can emit light, the needle pointer and the light source are optically connected behind the index plate.

2. A needle pointer meter as set forth in claim 1, characterized in that:
    the first through-vision section is formed by a penetrating portion;
    the plural light sources are disposed on the outer periphery of the indexes and at inner positions from the surface of the index plate such that respective light-emitting portions of the light sources face to the first through-vision section; and
    the needle pointer has a light introduction portion which extends between the light sources and the first through-vision section along the back surface of the index plate to introduce light emitted from the light sources toward the first through-vision section, an indicator which extends between the first through-vision section and the light sources along the front surface of the index plate to indicate the indexes, and an intermediate portion which connects the indicator and the light introduction portion on the first through-vision section side and introduces light coming from the light introduction portion to the indicator so that the indicator can emit light.

3. A needle pointer type meter as set forth in claim 2, characterized in that the light introduction portion extends from the intermediate portion forming a sector.

4. A needle pointer type meter as set forth in claim 2, characterized in that:
    a light introduction plate is disposed between the light introduction portion and the index plate or the indexes;
    the light-emitting portion of the light source is opposed to both the outer peripheral sides of the light introduction plate and the light introduction portion; and
    light emitted from the light source is introduced through the respective outer peripheral sides into the light introduction plate and the light introduction portion so that the indicator and the indexes can emit light.

5. A needle pointer type meter as set forth in claim 2, characterized in that:
    a light introduction plate is disposed between the light introduction portion and the index plate or the indexes;
    the light source is opposed to the outer peripheral side of the light introduction portion, and light emitted from the light source is introduced through the outer peripheral side of the light introduction portion so that the indicator can emit light;
    a plurality of index light sources which are disposed at certain intervals in such positions that respective light emitting portions of the index light sources face to the first through-vision section are opposed to the outer peripheral side of the light introduction plate; and
    light emitted from the index light sources is introduced through the outer peripheral side of the light introduction plate so that the indexes can emit light.

6. A needle pointer type meter as set forth in claim 5, characterized in that the light source and the index light source are supported by a common belt-shaped flexible conductor.

7. A needle pointer type meter as set forth in claim 1, characterized in that the light source is supported by a belt-shaped flexible conductor.

8. A needle pointer type meter as set forth in claim 1, characterized in that the movable body is a gear wheel which is rotated by the drive device.

9. A needle pointer type meter as set forth in claim 1, characterized in that the movable body is a belt-shaped body which is moved in the longitudinal direction by the drive device.

10. A needle pointer type meter, comprising:
    an index plate having a first through-vision section and indexes surrounding the first through-vision section;
    a movable body which has a second through-vision section corresponding to the first through-vision section;
    a drive device for moving the movable body;
    a needle pointer which is attached to the movable body and moves along the indexes around the first through-vision section;
    a light source for illuminating the needle pointer; and
    a display device for displaying predetermined information to an observer located at a front side of the index plate through the first and second through-vision sections, characterized in that:
    the light source is formed by a belt-shaped planar light-emitting body disposed along the movement route of the needle pointer, and the needle pointer is made of light-transmissive material which receives light from a particular light-emitting region of the light source in accordance with the movement of the needle pointer so that the needle pointer can emit light, the needle pointer and the light source are optically connected at a back side of the index plate.

11. A needle pointer type meter as set forth in claim 10, characterized in that:
the first through-vision section is formed by a penetrating portion;
the light source is disposed on the outer periphery of the indexes and at an inner position from the surface of the index plate such that the light-emitting region of the light source faces to the first through-vision section; and
the needle pointer has a light introduction portion which extends between the light source and the first through-vision section along the back surface of the index plate to introduce light emitted from the light source toward the first through-vision section, an indicator which extends between the first through-vision section and the light source along the front surface of the index plate to indicate the indexes, and an intermediate portion which connects the indicator and the light introduction portion on the first through-vision section side and introduces light coming from the light introduction portion to the indicator so that the indicator can emit light.

12. A needle pointer type meter as set forth in claim 11, characterized in that:
a light introduction plate is disposed between the light introduction portion and the index plate or the indexes;
the light-emitting region of the light source is opposed to both the outer peripheral sides of the light introduction plate and the light introduction portion; and
light emitted from the light source is introduced through the respective outer peripheral sides into the light introduction plate and the light introduction portion so that the indicator and the indexes can emit light.

13. A needle pointer type meter as set forth in claim 11, characterized in that:
a light introduction plate is disposed between the light introduction portion and the index plate or the indexes;
the light source is opposed to the outer peripheral side of the light introduction portion, and light emitted from the light source is introduced through the outer peripheral side of the light introduction portion so that the indicator can emit light;
an index light source formed by a belt-shaped planar light-emitting body disposed in such a position that a light-emitting region of the index light source faces to the first through-vision section is opposed to the outer peripheral side of the light introduction plate; and
light emitted from the index light source is introduced through the outer peripheral side of the light introduction plate so that the indexes can emit light.

14. A needle pointer type meter as set forth in claim 11, characterized in that:
a light introduction plate is disposed between the light introduction portion and the index plate or the indexes;
the light source is opposed to the outer peripheral side of the light introduction portion, and light emitted from the light source is introduced through the outer peripheral side of the light introduction portion so that the indicator can emit light;
an index light source formed by a pipe-shaped light-emitting body disposed in such a position that a light-emitting region of the index light source faces to the first through-vision section is opposed to the outer peripheral side of the light introduction plate; and light emitted from the index light source is introduced through the outer peripheral side of the light introduction plate so that the indexes can emit light.

15. A needle pointer type meter, comprising:
an index plate having a first through-vision section and indexes surrounding the first through-vision section;
a movable body which has a second through-vision section corresponding to the first through-vision section;
a drive device for moving the movable body;
a needle pointer which is attached to the movable body and moves along the indexes around the first through-vision section;
illumination means for illuminating the needle pointer; and
a display device for displaying predetermined information to an observer located at a front side of the index plate through the first and second through-vision sections, characterized in that:
the illumination means is formed by a light transmissive body disposed along the movement route of the needle pointer and a light source for supplying light such that the light transmissive body can emit light, and the needle pointer is made of light-transmissive material which receives light from a particular light-emitting region of the light transmissive body in accordance with the movement of the needle pointer so that the needle pointer can emit light, the needle pointer and the light transmissive body are optically connected at a back side of the index plane.

16. A needle pointer type meter as set forth in claim 15, characterized in that:
the first through-vision section is formed by a penetrating portion;
the light transmissive body is disposed on the outer periphery of the indexes and at an inner position from the surface of the index plate such that a light supplying portion for supplying light to the needle pointer faces to the first through-vision section; and
the needle pointer has a light introduction portion which extends between the light transmissive body and the first through-vision section along the back surface of the index plate to introduce light emitted from the light supplying portion of the light transmissive body toward the first through-vision section, an indicator which extends between the first through-vision section and the light transmissive body along the front surface of the index plate to indicate the indexes, and an intermediate portion which connects the indicator and the light introduction portion on the first through-vision section side and introduces light coming from the light introduction portion to the indicator so that the indicator can emit light.

17. A needle pointer type meter as set forth in claim 16, characterized in that:
a light introduction plate is disposed between the light introduction portion and the index plate or the indexes;
the light supplying portion of the light transmissive body is opposed to both the outer peripheral sides of the light introduction plate and the light introduction portion; and
light coming from the light transmissive body is introduced through the respective outer peripheral sides into the light introduction plate and the light introduction portion so that the indicator and the indexes can emit light.

18. A needle pointer type meter as set forth in claim 15, characterized in that:
the light transmissive body is formed by a circular-arc-shaped flat plate extending along the movement route of the needle pointer; and
the light source is opposed to the inner or outer peripheral edge of the circular-arc-shaped flat plate.

19. A needle pointer type meter as set forth in claim 18, characterized in that a condensing section for condensing light emitted from the light source is provided on the light transmissive body at the position opposed to the light source.

20. A needle pointer type meter as set forth in claim 15, characterized in that:
the light transmissive body has a circular-arc-shaped flat plate portion extending along the movement route of the needle pointer, and a pipe-shaped portion extending in a direction different from that of the flat plate portion; and
the light source is opposed to the pipe-shaped portion.

21. A needle pointer type meter, comprising:
an index plate having a first through-vision section and indexes surrounding the first through-vision section;
a movable body which has a second through-vision section corresponding to the first through-vision section;
a drive device for moving the movable body;
a needle pointer which is attached to the movable body and moves along the indexes around the first through-vision section;
a light source arranged behind the index plate for illuminating the needle pointer; and
a display device for displaying predetermined information to an observer located in front of the index plate through the first and second through-vision sections, characterized in that:
the light source is formed by a pipe-shaped light-emitting body disposed along the movement route of the needle pointer, and the needle pointer is made of light-transmissive material which receives light from a particular light-emitting region of the light source in accordance with the movement of the needle pointer so that the needle pointer can emit light, the needle pointer and the light source are optically connected behind the index plate.

* * * * *